United States Patent [19]

Stanton

[11] Patent Number: 5,528,468

[45] Date of Patent: Jun. 18, 1996

[54] OPERA LIGHT KIT AND INSTALLATION METHOD FOR AUTOMOBILE

[76] Inventor: Martin P. Stanton, 8471 SW. 10th La., Ocalano Beach, Fla. 34481

[21] Appl. No.: 274,167

[22] Filed: Jul. 14, 1994

[51] Int. Cl.$^6$ ................................................. B60Q 1/00
[52] U.S. Cl. ............................................. 362/80; 362/267
[58] Field of Search ............................... 362/61, 80, 267, 362/100, 311, 364, 365

[56] References Cited

U.S. PATENT DOCUMENTS

| | | | |
|---|---|---|---|
| 1,416,467 | 5/1922 | Hobbs | 362/80 |
| 1,761,345 | 6/1930 | Isackson | 362/80 |
| 3,017,500 | 1/1962 | Pezzopane | 240/8.2 |
| 3,532,871 | 10/1970 | Shipman | 240/7.1 |
| 4,855,878 | 8/1989 | Vu et al. | 362/66 |
| 4,953,065 | 8/1990 | Kao | 362/83 |
| 5,025,352 | 6/1991 | Brown | 362/83.3 |
| 5,038,255 | 8/1991 | Nishibashi et al. | 362/61 |
| 5,072,340 | 12/1991 | Jones | 362/80 |
| 5,255,164 | 10/1993 | Eidelman | 362/80 |

*Primary Examiner*—Stephen F. Husar
*Attorney, Agent, or Firm*—Oltman and Flynn

[57] ABSTRACT

A lighting fixture for attachment to a door post of an automobile having automobile electric circuitry includes a boot member for fitting against the door post, a mounting plate for fitting over the boot and including a light socket receiving structure, structure for securing the plate to the door post, so that the boot member is retained between the plate and the door post, a light socket for insertion into the light socket receiving structure, a light source for insertion into the light socket, a lens for removably securing over the plate with lens securing fasteners, and a fixture circuit for electrically connecting the light socket to the automobile electric circuitry. The socket preferably includes a socket screw having a screw head end and a light bulb receiving recess in the screw head end, and having an axial bore through which a positive fixture lead wire is fitted for electrically connecting the base of a light bulb with the automobile electric circuitry. A method is provided of installing the above-described light fixture on an automobile having a door post, and a door with a door frame, automobile circuitry and a tail light and a tail light lead wire, including the steps of marking a desired light fixture location on the door post, cutting away a portion of the door flange to form a notch which registers with the desired light fixture location, securing the boot and the plate to the door post, connecting the fixture lead wire to the automobile circuitry.

9 Claims, 3 Drawing Sheets

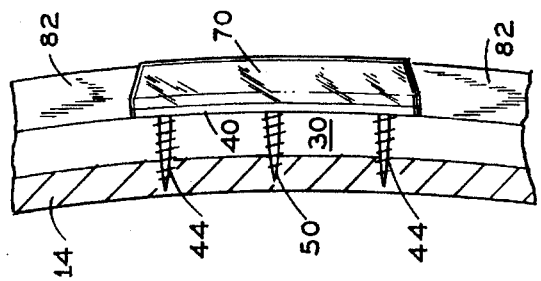
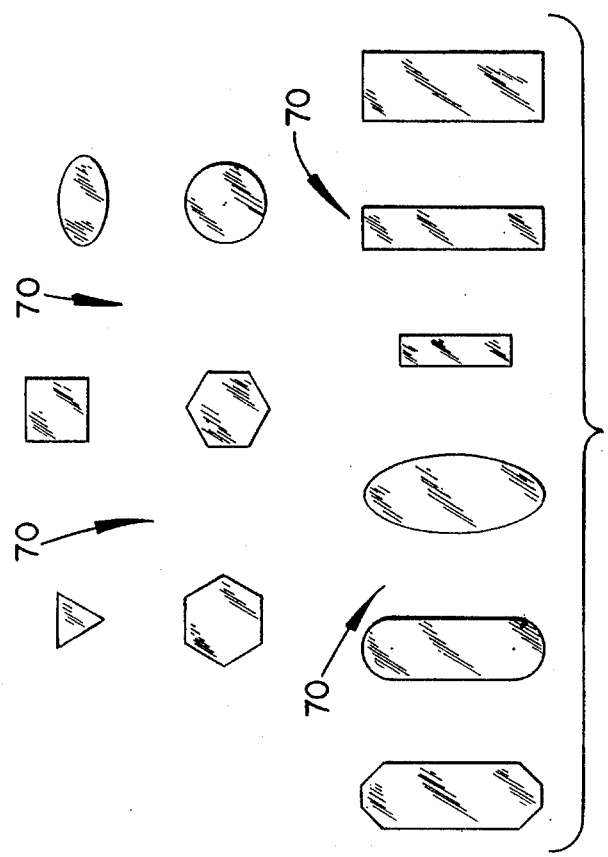
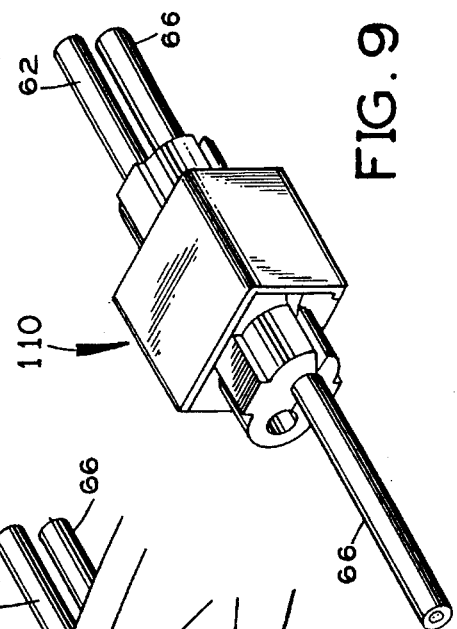
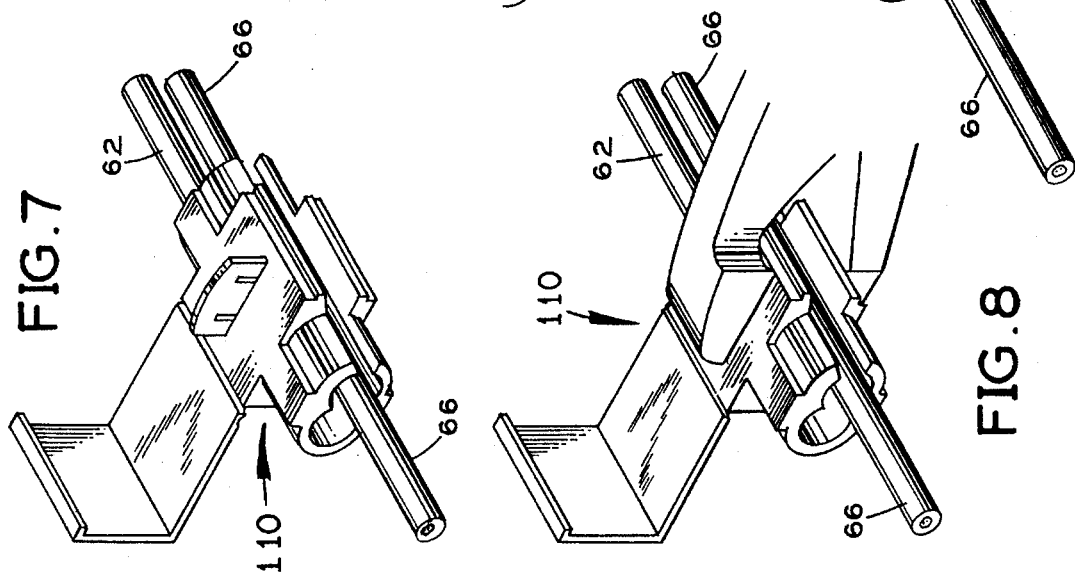

OPERA LIGHT KIT AND INSTALLATION METHOD FOR AUTOMOBILE

BACKGROUND OF THE INVENTION

1. Field of the Invention

The present invention relates generally to the field of lighting fixtures on vehicles, and more specifically to an aftermarket lighting fixture kit for attachment to a door post of an automobile between the front and rear side windows. The kit includes a substantially rectangular rubber boot to be fitted against the door post. A rectangular plate having a screw hole at each end is secured over the boot. The screws extend through the plate and into the door post, compressing the boot against the post. The plate has a light socket receiving opening at its center into which an inventive light socket/sheet metal screw is inserted into the door post. A standard twelve-volt light bulb is removably inserted into a recess in the head of the screw, and an insulated positive lead wire makes contact with the base of a light bulb and extends through an axial bore though the screw, exiting from the tip of the screw. From there the lead wire is threaded through the automobile body and into the trunk of the automobile, and is connected to the tail light wiring to draw power from the battery when the automobile lights are turned on. A translucent plastic lens or cover has tabs which removably snap into slots in the plate. A notch or hole is cut into the door flange or flanges covering the post at the fixture location for exposing the lens when the doors are closed.

2. Description of the Prior Art

There have long been various lighting fixtures for illuminating an automobile for style and safety. For example, opera lights which mount on the door post are known.

One such lighting fixture is that of Pezzopane, U.S. Pat. No. 3,017,500, issued on Jan. 16, 1962, which reveals a lamp assembly mounted in automobile fenders above the wheels. A hole is made in the fender which receives, a cylindrical bulb retaining chamber having a removably outer lens. The light is intended to facilitate changing tires at night, and for gauging distance to adjacent vehicles during driving and parking. A problem with Pezzopane is that the lights are aesthetically unappealing, resembling airplane running lights or illuminated ship port holes.

Shipman, U.S. Pat. No. 3,532,871, issued on Oct. 6, 1970, discloses a combination running light-reflector for mounting on a motor vehicle, such as on a fender. Shipman includes a lens shaped to allegedly provide efficient light reflection through which both reflective ambient light and light emitted from a bulb are projected. A problem with Shipman is that no provision is made for securing the light to a door post to function as an opera light.

Vu, et al., U.S. Pat. No. 4,855,878, issued on Aug. 8, 1989, reveals a back-up side fender light. The light includes a bulb wired within a housing removably mounted within an automobile front fender. The lamp is wired to activate when the vehicle gear shift lever is placed in the reverse position. A problem with Vu, et al., if used as an opera light, is that no method, structure or circuitry for mounting to a door post is provided.

Kao, U.S. Pat. No. 4,953,065, issued on Aug. 28, 1990, discloses a brake light device for mounting on a truck fender. The purpose of this Kao device is to position a brake light lower than the truck trailer so that it is at the level of an automobile driver and more easily seen. Kao may be suited for its purpose, but provides no needed structure, circuitry or attachment procedure for use as an opera light. If the Kao circuitry were used, the opera light would only come on when the brakes are applied. Another problem with Kao is that it is needlessly complex and expensive.

Brown, U.S. Pat. No. 5,025,352, issued on Jun. 18, 1991, reveals lighted grab handles for trucks. A vertically extending gripping portion has means for attachment to a motor vehicle, and a lamp means at one or both ends. The lamps are electrically connected to the vehicle running lamp circuitry. A problem with Brown is that it would make a luxury car look like a utility vehicle if such a handle were projecting from a door post, and the handle may block closing of the doors as well.

Nishihashi, et al., U.S. Pat. No. 5,038,253, issued on Aug. 6, 1991, discloses a vehicle lamp having a series of individual light sources within an elongate casing. Nishihashi is too bulky, complex and expensive for use as an opera light, and does not teach installation on a door post nor for avoidance of door flanges interference.

Jones, U.S. Pat. No. 5,072,340, issued on Dec. 10, 1991, teaches a signal lamp visible to a vehicle driver. This lamp apparatus is mounted either on top of the hood above the headlights or on the rear side portions of the rear fenders. Jones, like Nishihashi, fails to disclose means for installation on a door post nor for avoidance of door flange interference.

Eidelman, U.S. Pat. No. 5,255,164, issued on Oct. 19, 1993, reveals safety light markers for the sides and roof of a motor vehicle. Eidelman includes elongated light sources connected to the vehicle signalling and electrical circuit, to provide braking, parking, emergency flasher and turn indications conspicuously visible from the sides of the vehicle. The teachings of Eidelman presents the problems of Nishihashi if applied to an opera light assembly.

It is thus an object of the present invention to provide an opera light apparatus and method for after-market installation on an automobile or other vehicle.

It is another object of the present invention to provide such an apparatus and method which produce a durable, easily serviced, opera light fixture which adjusts in height and in contour to become flush with the flanges of the automobile doors.

It is still another object of the present invention to provide such an apparatus which has a minimum number of parts and is easy to install for one of average skill in automobile servicing.

It is finally an object of the present invention to provide such an apparatus which is inexpensive to manufacture.

SUMMARY OF THE INVENTION

The present invention accomplishes the above-stated objectives, as well as others, as may be determined by a fair reading and interpretation of the entire specification.

A lighting fixture is provided for attachment to a door post of an automobile having automobile electric circuitry, including a boot member for fitting against the door post, a mounting plate for fitting over the boot and including a light socket receiving structure, structure for securing the plate to the door post, so that the boot member is retained between the plate and the door post, a light socket for insertion into the light socket receiving structure, a light source for insertion into the light socket, a lens for removably securing over the plate with lens securing fasteners, and a fixture circuit for electrically connecting the light socket to the automobile electric circuitry. Where the automobile electric circuitry includes a tail light lead wire and a tail light, the fixture circuit is preferably electrically connected to the tail light lead wire for activation simultaneously with the tail light. The boot member preferably includes a substantially rectangular loop of flexible, resilient material having a boot side wall of accordion configuration. The socket preferably includes a socket screw having a screw head end and a light bulb receiving recess in the screw head end, and having an axial bore through which a positive fixture lead wire is fitted for electrically connecting the base of a light bulb with the automobile electric circuitry.

A light bulb socket apparatus is also provided, including a sheet metal screw having a distal end and a proximal head end and a shank portion, a light bulb receiving recess in the head end, and a lead wire passageway extending axially through the shank portion.

A method is provided of installing the above-described light fixture on an automobile having a door post, and a door with a door frame, automobile circuitry and a tail light and a tail light lead wire, including the steps of marking a desired light fixture location on the door post, cutting away a portion of the door flange to form a notch which registers with the desired light fixture location, securing the boot and the plate to the door post, connecting the fixture lead wire to the automobile circuitry. Where the door flange has an outer surface and where the structure for securing the plate permits adjustment of the distance of the plate from the door post, the method may include the additional step of adjusting the structure for securing the plate to the door post so that the lens is positioned at a distance from the door post substantially equivalent to the distance of the door flange outer surface from the door post. Where the structure for securing the plate permits adjustment of the curvature of the plate with respect to the door post, the method includes the additional step of adjusting the structure for securing the plate to the door post so that the lens is curved in a shape substantially equivalent with the curvature of the door flange outer surface.

BRIEF DESCRIPTION OF THE DRAWINGS

Various other objects, advantages, and features of the invention will become apparent to those skilled in the art from the following discussion taken in conjunction with the following drawings, in which:

FIGS. 7–9 show the installation steps for an electro-tap connector, the fixture and tail light lead wires first being placed in the connector, then being clamped by pliers to pierce the wire insulation and electrically join them with a bridge member, and the final installed appearance.

FIG. 10 is view of a non-exhaustive assortment of contemplated lens configurations.

FIG. 11 is a cross-sectional side view of a side of an automobile taken just forward of a door post, showing the adjusted spacing and adjusted curvature of the apparatus plate to match the distance and curvature of the door flanges. The boot is broken away to reveal the three screws passing through the plate and into the door post, these screws having been turned to make these plate adjustments.

DETAILED DESCRIPTION OF THE PREFERRED EMBODIMENTS

Figure 1:
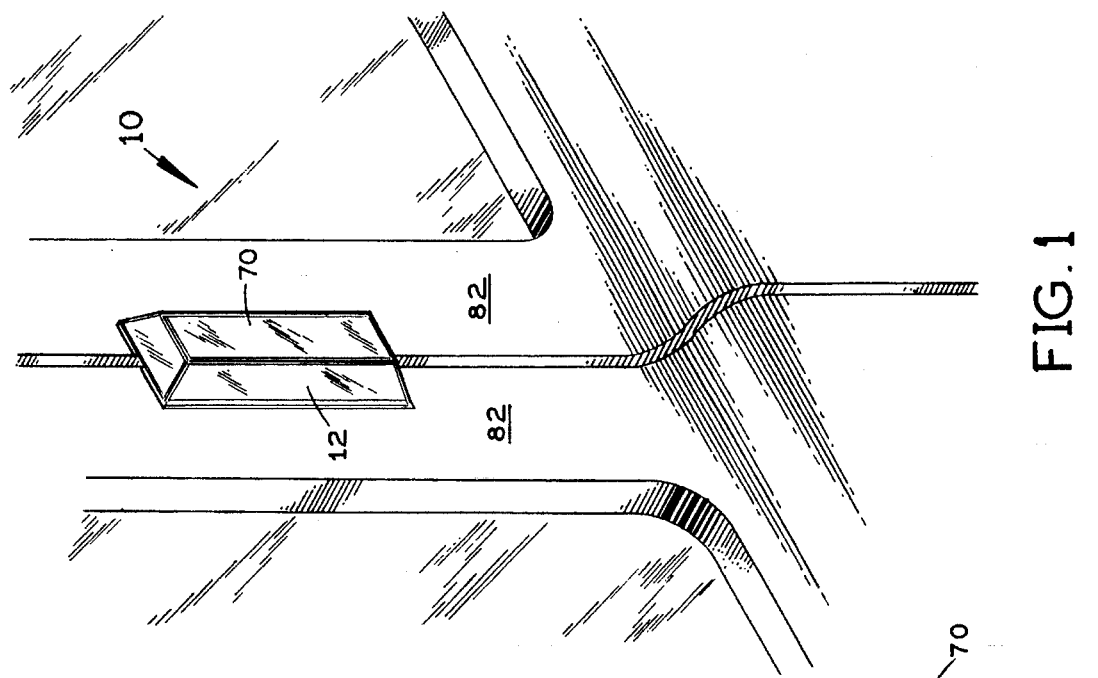
FIG. 1 is a perspective view of the inventive fixture apparatus installed on the door post of an automobile, where two door flanges meet at the post.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
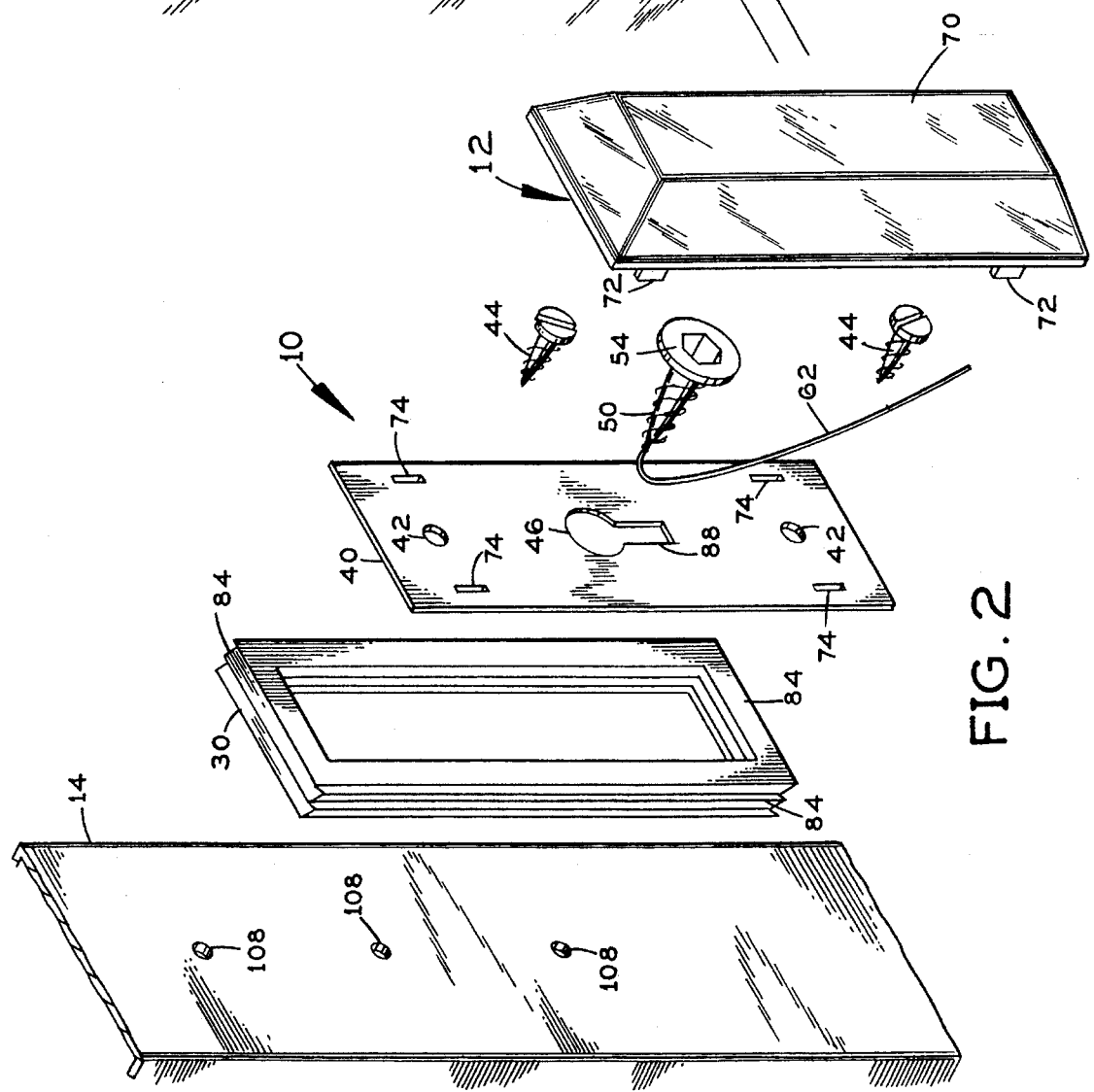
FIG. 2 is an exploded view of the apparatus, showing the elements of the kit for assembly.
Figure 3:
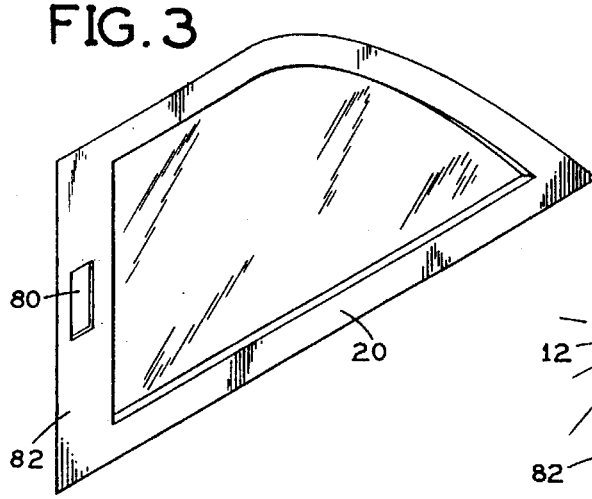
FIG. 3 is a perspective view of an automobile window and door upper portion with a hole cut out of the flange, where only a single flange covers the door post.
Figure 4:
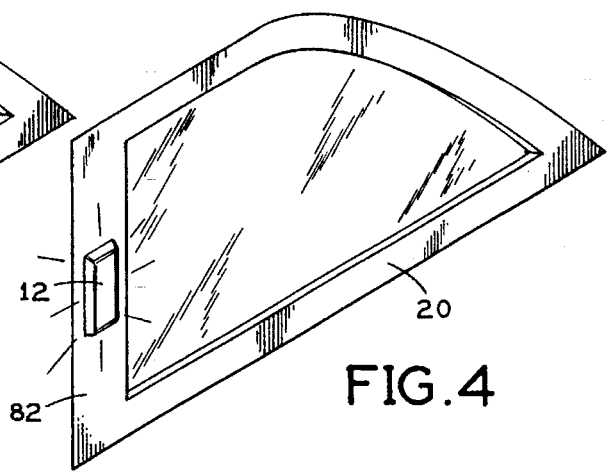
FIG. 4 is a view as in FIG. 3, except with the light fixture installed in the flange hole.
Figure 5:
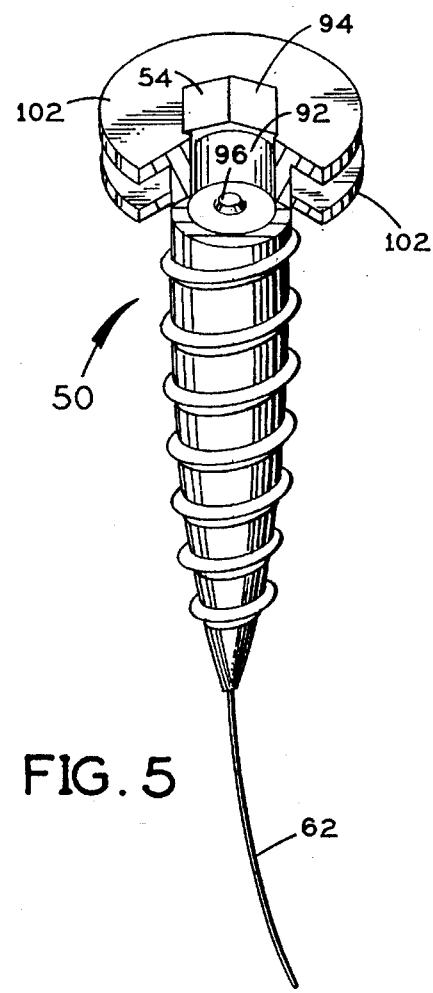
FIGS. 5 and 6 are a perspective view and a side view of the inventive socket screw, respectively.
Figure 6:
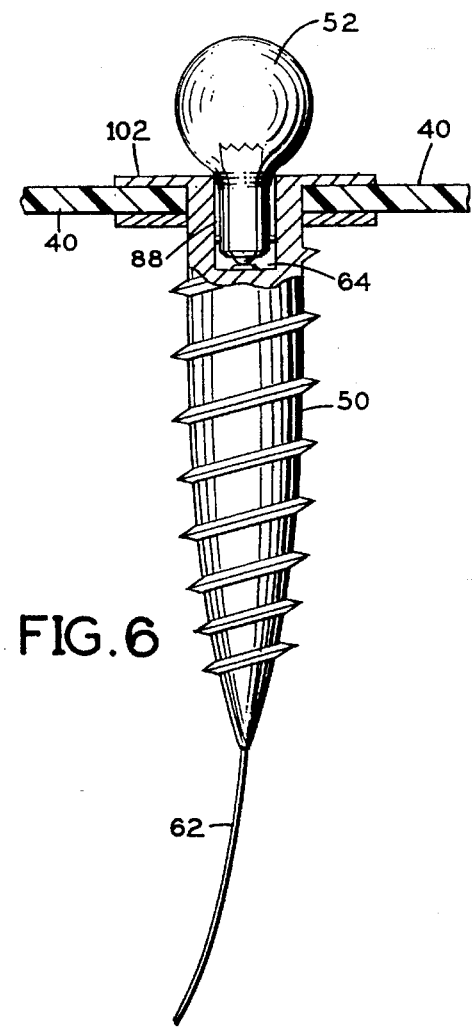

Referring to FIGS. 1–11, an aftermarket kit 10 is disclosed for constructing an opera light fixture 12 on a door post 14 of an automobile 20 between the front and rear side windows 22 and 24, respectively. See FIG. 1. The kit 10 comprises a substantially rectangular rubber boot 30 for fitting against door post 14. See FIG. 2. A rectangular plastic plate 40 having a screw hole 42 at each end is secured over boot 30. Securing screws 44 extend first through plate 40 and into post 14, compressing boot 30 against post 14. Plate 40 has a light socket receiving key-shaped port 46 at its center, into which an inventive light socket/sheet metal screw 50 is inserted into door post 14. A standard twelve-volt light bulb 52 is removably inserted into a recess 54 in the head 56 of screw 50, and an insulated positive lead wire 62 make contact with the base 64 of light bulb 52 and extends axially though screw 50, exiting from the tip of screw 50. From there lead wire 62 is threaded through the automobile 20 body and into the trunk of automobile 20. Lead wire 62 is connected to a tail light lead wire 66 to draw power from the automobile battery when the automobile lights are activated. A flexible, translucent plastic lens 70 or cover has tabs 72 which removably snap into slots 74 in plate 40. A notch or hole 80 is cut into the door flange or flanges 82 covering the post 14 at the fixture 12 location for exposing lens 70, so that lens 70 is substantially flush with the outer surface of each flange 82. See FIGS. 3 and 4.

Boot 30 is preferably a short tube of rectangular cross-section having side walls 84 of compressible bellows or accordion configuration. See FIG. 1. This construction permits boot 30 to perform an electrical insulating function, as well as an adaptive shaping and seating function. Boot 30 is alternatively formed of foam rubber, to once again perform its adaptive shaping and seating function. The light socket/sheet metal screw 50 is preferably of an Allen head pipe plug construction. A bulb socket 92 is recessed into the floor of the wrench socket recess 94, into which light bulb 52 is secured. See FIGS. 5 and 6. In the floor of bulb socket 92 is an insulated positive terminal 96 connected to lead wire 62. A plate engagement ring 102 is preferably provided around the head of screw 50 to engagingly slide into the port keyway 88. See FIG. 6. Screw 50 grounds into post 14 and thus into the automobile 20 body. It is alternatively contemplated that a conventional socket might snap into port 46, but such sockets are bulky and less secure in their mountings. In such an event the plate 40 may be conductive so that screws 44 ground the light circuit.

Method

In practicing the invention, the following method may be used. The automobile door or doors are closed. The kit 10 is installed by first marking with a grease pencil, chalk or other marking means the desired location of the light fixture 12. This location would normally be on the door flange or flanges 82 and over the center of the door post 14. Then plate 40 or a special template (not shown) is placed against the door flange or flanges 82 location to mark the locations of the tapping holes 108. A drill bit is selected of sufficient length to penetrate both the flange 82 and door post 14 behind flange or flanges 82. Tapping holes 108 are then drilled through flange of flanges 82 and into door post 14. Then the template is removed and the door or doors are opened. A notch 80 is cut into flange or flanges 82 with a suitable saw such as a jig saw along the line traced with the template. Then lead wire 62 is threaded through the center hole 108 corresponding to port 46 and through the body side portions into the trunk. Lead wire 62 is attached to a tail light lead wire 66 with an electro-tap connector 110. See FIGS. 7–9. As a result of this connection, the light bulb 52 lights when the automobile headlights are turned on, which also lights the taillights. Boot 30 is fitted over the marked location, and plate 40 is placed over boot 30. Place plate 40 so that keyway 88 is over screw 50 hole 108 and then insert and turn screw 50 into hole 108. Two securing screws 44 are inserted into plate 40 end holes 42 and tappingly screwed into the drilled post 14 holes 108.

Upon insertion of screws 44, both the elevation and contour of plate 40 are adjusted. See FIG. 11. These method steps are both novel and important because the doors of each style of vehicle differ in door flange 82 distance from door post 14 and in outer flange 82 curvature. First the automobile door or doors are closed. Then extent of plate 40 distance from door post 14 is adjusted by rotating screws 44 and 50 until a position is achieved placing lens 70 flush with the outer surface of flange or flanges 82. The contour of plate 40 and therefore of lens 70 is adjusted as well, by rotating screws 44 and screw 50. The individual distances to which screws 44 and screw 50 protrude from door post 14 relative to each other is adjusted to make plate 40 flex to match the door flange 82 curvature. This adjustment may require screwing screws 44 further into door post 14 than screw 50 so that the middle of plate 40 protrudes further from door post 14 than do the ends of plate 40. The pressure of boot 30 against plate 40 may force plate 40 against the heads of screws 44 and 50 to achieve the desired plate 40 curvature, or edges of holes 108 may engage the threads of screws 44 and 50 to cause plate 40 to curve or bow either concavely or convexly relative to door post 14. Lens 70 is then snapped into slots 74 in plate 40, and assumes the adjusted curvature of plate 40 to thus follow the door flange 82 curvature. A variety of lens 70 sizes and shapes are contemplated. See FIG. 10 for examples.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A lighting fixture for attachment to a door post of an automobile having automobile electric circuitry, comprising:

a boot member for fitting against said door post, a mounting plate for fitting over said boot and comprising light socket receiving means, means for securing said plate to said door post, such that said boot member is retained between said plate and said door post, light socket means for insertion into said light socket receiving means, a light bulb for insertion into said light socket means, lens means for removably securing over said plate means with lens securing means, fixture circuit means for electrically connecting said light socket means to said automobile electric circuitry.

2. The apparatus of claim 1, wherein said automobile electric circuitry comprises a tail light lead wire and a tail light, and wherein said fixture circuit means are electrically connected to said tail light lead wire for activation simultaneously with said tail light.

3. The apparatus of claim 1, wherein said boot member comprises a substantially rectangular loop of flexible, resilient material having a boot side wall of accordion configuration.

4. The apparatus of claim 1, wherein said socket means comprises a socket screw having a screw head end and a light bulb receiving recess in said screw head end, and having an axial bore through which a positive fixture lead wire is fitted for electrically connecting the base of a light bulb with said automobile electric circuitry.

5. The apparatus of claim 4, wherein said screw is a sheet metal screw having an Allen wrench socket, with a wrench socket floor, at said screw head end, and wherein said bulb receiving recess is recessed into said wrench socket floor.

6. The apparatus of claim 1, wherein said fixture circuit means comprises an electro-tap connector for joining said fixture lead wire to said automobile circuitry.

7. A method of installing a light fixture on an automobile having a door post, and a door with a door frame, automobile circuitry and a tail light and a tail light lead wire, wherein said light fixture comprises a boot member for fitting against said door post, a mounting plate for fitting over said boot and comprising light socket receiving means, means for securing said plate to said door post, such that said boot member is retained between said plate and said door post, light socket means for insertion into said light socket receiving means, light source means for insertion into said light socket means, lens means for removably securing over said plate means with lens securing means, fixture circuit means for electrically connecting said light socket means to said automobile electric circuitry, comprising the steps of:

marking a desired light fixture location on said door post, cutting away a portion of said door flange to form a notch which registers with said desired light fixture location, securing said boot and said plate to said door post, connecting said fixture lead wire to said automobile circuitry.

8. A method according to claim 7, wherein said door flange has an outer surface and wherein said means for securing said plate permits adjustment of the distance of said plate from said door post, comprising the additional step of:

adjusting said means for securing said plate to said door post such that said lens is positioned at a distance from said door post substantially equivalent to the distance of said door flange outer surface from said door post.

9. A method according to claim 7, wherein said door flange has an outer surface and wherein said means for securing said plate permits adjustment of the curvature of said plate with respect to said door post, comprising the additional step of:

adjusting said means for securing said plate to said door post such that said lens is curved in a shape substantially equivalent with the curvature of said door flange outer surface.

* * * * *